UNITED STATES PATENT OFFICE.

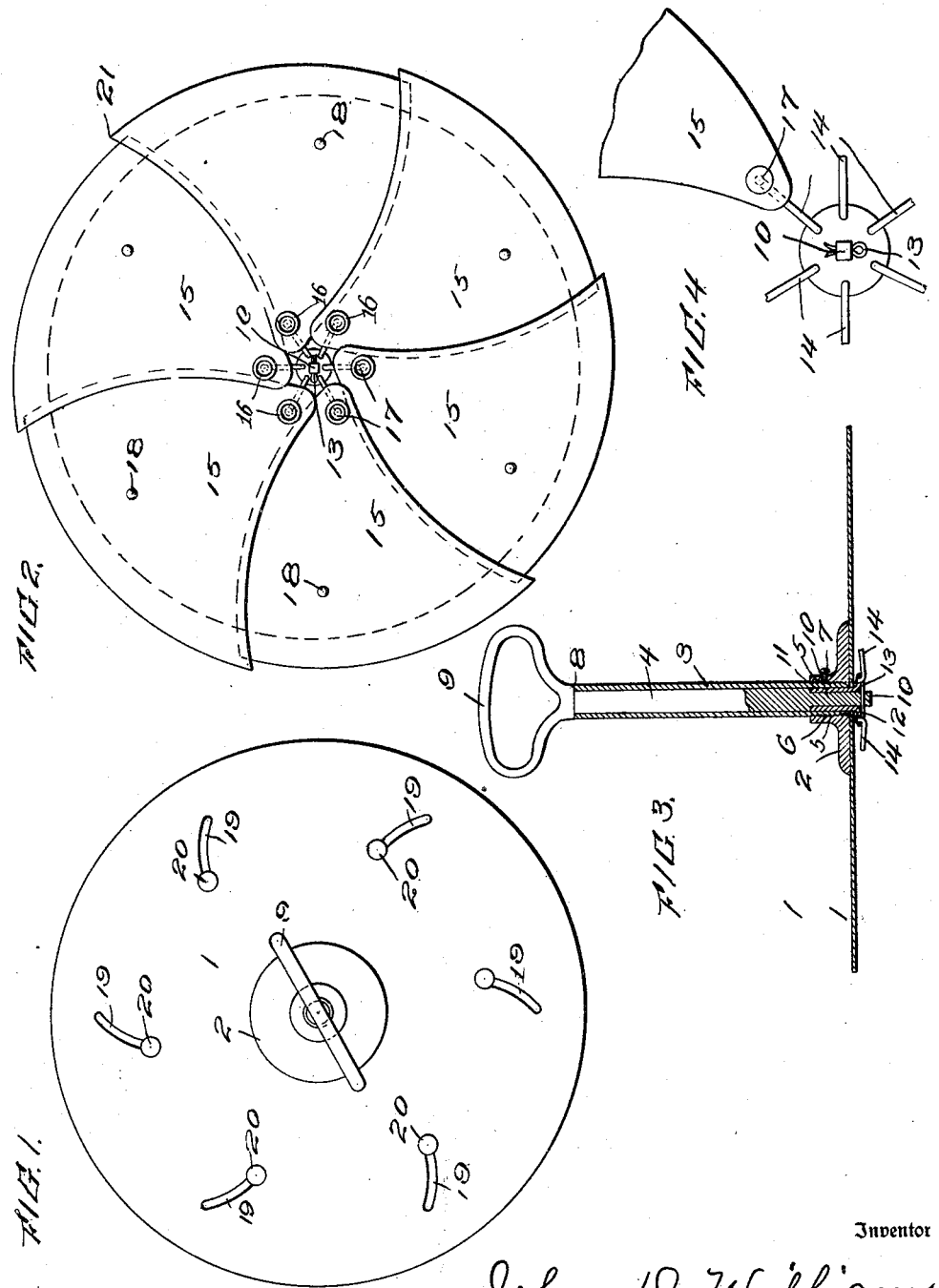

JOHN D. WILLIAMS, OF WILKES-BARRE, PENNSYLVANIA.

GUARD FOR ICE-CREAM FREEZERS.

1,121,439.  Specification of Letters Patent.  Patented Dec. 15, 1914.

Application filed August 9, 1913. Serial No. 784,000.

*To all whom it may concern:*

Be it known that I, JOHN D. WILLIAMS, a citizen of the United States, residing at Wilkes-Barre, in the county of Luzerne and State of Pennsylvania, have invented certain new and useful Improvements in Guards for Ice-Cream Freezers; and I do hereby declare the following to be a full, clear, and exact description of the invention, such as will enable others skilled in the art to which it appertains to make and use the same.

This invention relates to protectors or guards for ice cream freezers and the like, and an object of the invention is to provide an adjustable guard which may be inserted into the freezer and then expanded until the sides of the guard engage the walls of the freezer.

A further object of the invention is to provide a guard having an expanding periphery with means for keeping the periphery smooth and free from points or serrations which may be caused by the extending corners of the several expanding members.

A further object of the invention is to provide a guard having a handle and backing plate so arranged as to facilitate the turning of the handle with one hand while the guard is held with the other to expand the periphery of the same.

With these and other objects in view, the invention consists in certain novel constructions, combinations and arrangements of the parts which will be hereinafter fully described and claimed.

In the drawings, where similar reference characters designate corresponding parts: Figure 1 is a top plan view of the guard, the same being in contracted position; Fig. 2 is a bottom plan view of the guard in extended position; Fig. 3 is a vertical section through the handle; Fig. 4 is an enlarged detail view of the bottom of the handle and adjacent parts.

It is found that when ice cream cans stand over night or for any length of time, there forms on the walls of the freezer a coat of ice which must be removed before cream can be served to prevent mixing of the ice and cream. Ordinarily, a spatula or scoop is used for the removal of the ice, but the use of these implements is usually attended by some falling of the ice into the cream.

The present invention aims to provide a guard which may be lowered to the level of the cream and then expanded to cover the cream completely, after which the ice may be removed by a spatula or the like as usual, thus preventing ice from falling into the cream.

The general embodiment of the invention comprises a slotted plate carrying a tube through which passes the rod of a rotatably mounted handle, the lower end of which rod is connected to expanding sectors by means of links, the expanding sectors being provided with means for guiding the same in the slots formed in the plate. As described hereinafter, the slots formed in the plate bear such a relation to the handle rod and links that the central portions of the exposed edge of the sectors engage adjacent sides of the can before the pointed ends of the exposed edge of the sectors.

Referring to the drawings, it will be seen that a plate 1 has extending from the upper central portion thereof a boss 2, which may receive and have rigidly secured thereto a tube 3 through which passes a rotatable rod 4. The tube 3 may be secured rigidly to the boss, or as shown in the drawings, the lower end of said tube may be threaded as at 5, to be engaged by the threads 6 cut upon the bore of the boss 2, there being provided a set screw 7 through the reduced neck portion of the boss for holding the tube securely to said boss and plate. The upper end of the rod 4 is enlarged to form a shoulder 8 adjacent the upper end of the tube 3, there being a handle 9 formed in any approved manner upon the handle or rod 4. The lower end of the rod 4 is provided with a reduced squared portion 10 which fits into a sleeve 11 having an internally squared bore for receiving the reduced end 10. The outer end of the sleeve 11 is provided with a flange 12 beyond which the reduced end 10 extends and against which rests a cotter pin 13 passing through the projecting end 10. The object in having the end 10 squared, is to require the sleeve 11 to turn whenever the handle 9 is turned, this turning being independent of the position of the tube 3 and the plate 1.

Pivotally connected to the flange 12 are several links 14, each one of which is connected to the inner vertex of a circularly triangular sector 15 formed substantially as shown in the drawings and connected to the link 14 by means of a head 16 which is received by a dished portion 17 on the inner end of each of the sectors. These sectors are also provided with pins 18 having heads 20 which guide the pins 18 within the slots 19 formed in the plate 1. The plate 1 is provided with as many of these slots 19 as there are sectors and links, and the object of the slots is to guide each sector as the same moves outwardly. While the sectors are in the form of circular triangles, yet I wish it understood that other convenient forms of sectors may be used so long as the outwardly extending edge is arcuate, and the term "circularly triangular" is used with this understanding.

In order to prevent the outer corners 21 of the sectors from extending beyond the circumference of the expansible circle formed by the outer edges of the sectors in any extended position, the slots 19 are curved as indicated in the top plan shown in Fig. 1, the curvature being such with respect to the length of the links and the distance between the heads 16 and pins 18, that the ends 21 remain under the curved edge of the adjacent sector.

The device is designed for the purpose of removing ice which forms over night upon the walls of a partially filled ice cream can and the method of operation is to turn the handle 9 while holding the tube 3 in the hand in such a way as to contract the guard sectors, after which the same may be lowered into the cream can until the sectors rest on top of the cream, then by grasping the tube 3 and boss 2 with the hand, the handle 9 may be turned to expand the periphery of the guard until the arcuate edges of the sectors engage the walls of the freezer. The ordinary spatula is used for scraping the ice from the walls, so that the said ice falls upon the expanded protector or guard, after which the whole device may be lifted from the cream can and if desired, just as the guard emerges from the top of the can, it may be further expanded, so that any ice which may be near enough to the edge to fall off, will fall outside of the cream can, and not inside. Of course if the ice which is formed upon the walls of the cream can be not very solid, it will be possible to insert the guard to the level of the cream and after expanding the same in the manner already described, lift the same when the ice can be scraped from the walls.

It will be most desirable to make the guard for use with a given size of cream can, in which case the various parts may be proportioned so that when the handle is turned to extend the periphery of the guard the required amount the several arcuate edges of the guard will lie practically in the circumference of a circle.

By having the slots 19 and the actuating members for the sectors properly proportioned, the central portions of the exposed arcuate edges of the sectors may move in a line substantially radial from the rod 4, while the outer corners of said sectors will move in non-radial lines, and therefore for a given turn of the rod 4, will not be so far from said rod as the central portion of the outer edge.

While the guard or protector has been shown as provided with sectors on the bottom of the plate 1, yet I realize that other dispositions of the expanding members may be had with the same results attending the use of the form disclosed, and I wish it also to be understood that the method of securing the rod 4 to the several sectors and of securing the same against longitudinal movement within the tube 3 may be varied from that shown in the drawings without departing from the spirit of the invention.

Having thus described the invention, what is claimed as new is:

1. A guard comprising a plate, a member rotatably mounted with respect to the plate, a plurality of overlapping sectors having the form of circular triangles, means connecting the rotatable member with each of the sectors adapted to move the latter in substantially radial lines as the rotatable member revolves, projections carried by the sectors and means formed in the plate adapted to receive the projections to guide the central portion of the outer arcuate side of each of the sectors substantially radially as the sectors move.

2. A guard comprising a plate, a member rotatably mounted with respect to the plate, a plurality of sectors having arcuate outer edges, links connected to the rotatable member, said links connected to the inner vertices of the sectors, guide means secured to the plate and engaging the sectors side means adapted to guide the sectors to move radially as the rotatable member is rotated.

3. A guard comprising a plate, a rotatable member, a plurality of sectors having outer arcuate edges, means connecting the rotatable member with the sectors adapted to move the sectors in substantially radial lines when the rotatable member rotates, guide pins carried by the sectors and curved guide slots formed in the plate adapted to receive the guide pins, the concave side of the curved slots being toward the rotatable member.

In testimony whereof I affix my signature in presence of two witnesses.

JOHN D. WILLIAMS.

Witnesses:
CATHERINE M. KANE,
W. J. TREMBATH.